(12) United States Patent
Mayer

(10) Patent No.: US 10,502,325 B2
(45) Date of Patent: Dec. 10, 2019

(54) VALVE, PREFERABLY VACUUM VALVE

(71) Applicant: VAT Holding AG, Haag (CH)

(72) Inventor: Thomas Mayer, Hohenems (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 15/746,939

(22) PCT Filed: Jul. 13, 2016

(86) PCT No.: PCT/EP2016/066675
§ 371 (c)(1),
(2) Date: Jan. 23, 2018

(87) PCT Pub. No.: WO2017/021120
PCT Pub. Date: Feb. 9, 2017

(65) Prior Publication Data
US 2018/0224005 A1    Aug. 9, 2018

(30) Foreign Application Priority Data
Aug. 6, 2015 (AT) .................................. A 520/2015

(51) Int. Cl.
*F16K 3/18*  (2006.01)
*F16K 3/02*  (2006.01)

(52) U.S. Cl.
CPC .............. *F16K 3/18* (2013.01); *F16K 3/0227* (2013.01)

(58) Field of Classification Search
CPC ........ F16K 3/18; F16K 3/0227; F16K 3/0218; F16K 3/188
USPC ............. 251/84–88, 193–204, 326, 329, 333
See application file for complete search history.

(56) References Cited

U.S. PATENT DOCUMENTS

| | | | |
|---|---|---|---|
| 373,522 A * | 11/1887 | Giles | F16K 1/482 251/86 |
| 929,589 A | 7/1909 | Harding | |
| 1,462,636 A | 7/1923 | Edler | |
| 2,152,784 A | 4/1939 | Birrell | |
| 3,198,478 A * | 8/1965 | Johnston | F16K 31/05 251/129.03 |
| 4,294,427 A * | 10/1981 | Cilny | F16K 3/14 251/158 |
| 4,338,689 A | 7/1982 | Zieg | |
| 4,395,049 A | 7/1983 | Schertler | |

(Continued)

FOREIGN PATENT DOCUMENTS

| | | |
|---|---|---|
| CH | 659512 | 1/1987 |
| CN | 101201118 | 6/2008 |

(Continued)

*Primary Examiner* — Marina A Tietjen
(74) *Attorney, Agent, or Firm* — Volpe and Koenig, P.C.

(57) ABSTRACT

A valve (1), preferably a vacuum valve, is provided including at least one closure element (2), at least one valve seat (3), and at least one drive unit (4). The closure element (2) is pressed against the valve seat (3) in a closed position and is raised from the valve seat (3) in a raised position, and the closure element can be moved by a drive unit (4) in a closing direction (5) from the raised position into the closed position, in particular in a linear closing direction. The closure element (2) is mounted on a support body (6) of the drive unit (4) in a movable manner in at least one direction (7) orthogonally or transversely to the closing direction (5) in order to align the closure element (2) when pressing against the valve seat (3).

11 Claims, 2 Drawing Sheets

(56) References Cited

U.S. PATENT DOCUMENTS

| | | | |
|---|---|---|---|
| 4,560,141 A | | 12/1985 | Bosch |
| 4,627,599 A | | 12/1986 | Ehmig |
| 4,671,487 A | * | 6/1987 | Bragin ............... F16K 3/184 251/204 |
| 5,029,809 A | * | 7/1991 | Coureau ............. F16K 3/18 251/167 |
| 5,217,200 A | | 6/1993 | Hutchings et al. |
| 5,667,197 A | | 9/1997 | Boyd et al. |
| 7,481,417 B2 | * | 1/2009 | Mayer ............... F16K 41/10 251/158 |
| 8,678,344 B2 | * | 3/2014 | Ehrne ............... F16K 3/314 251/193 |
| 2005/0199848 A1 | | 9/2005 | Seitz |

FOREIGN PATENT DOCUMENTS

| | | |
|---|---|---|
| DE | 2951150 | 7/1981 |
| DE | 3139755 | 11/1982 |
| DE | 4446947 | 7/1997 |
| EP | 1111280 | 6/2001 |
| GB | 1440572 | 6/1976 |
| GB | 2116680 | 9/1983 |
| JP | S4913429 | 2/1974 |
| JP | S62172863 | 11/1987 |
| JP | H0542282 | 10/1993 |
| JP | 2005106118 | 4/2005 |
| SU | 1093854 | 5/1984 |
| WO | 2004102055 | 11/2004 |
| WO | 2016073822 | 5/2016 |

\* cited by examiner

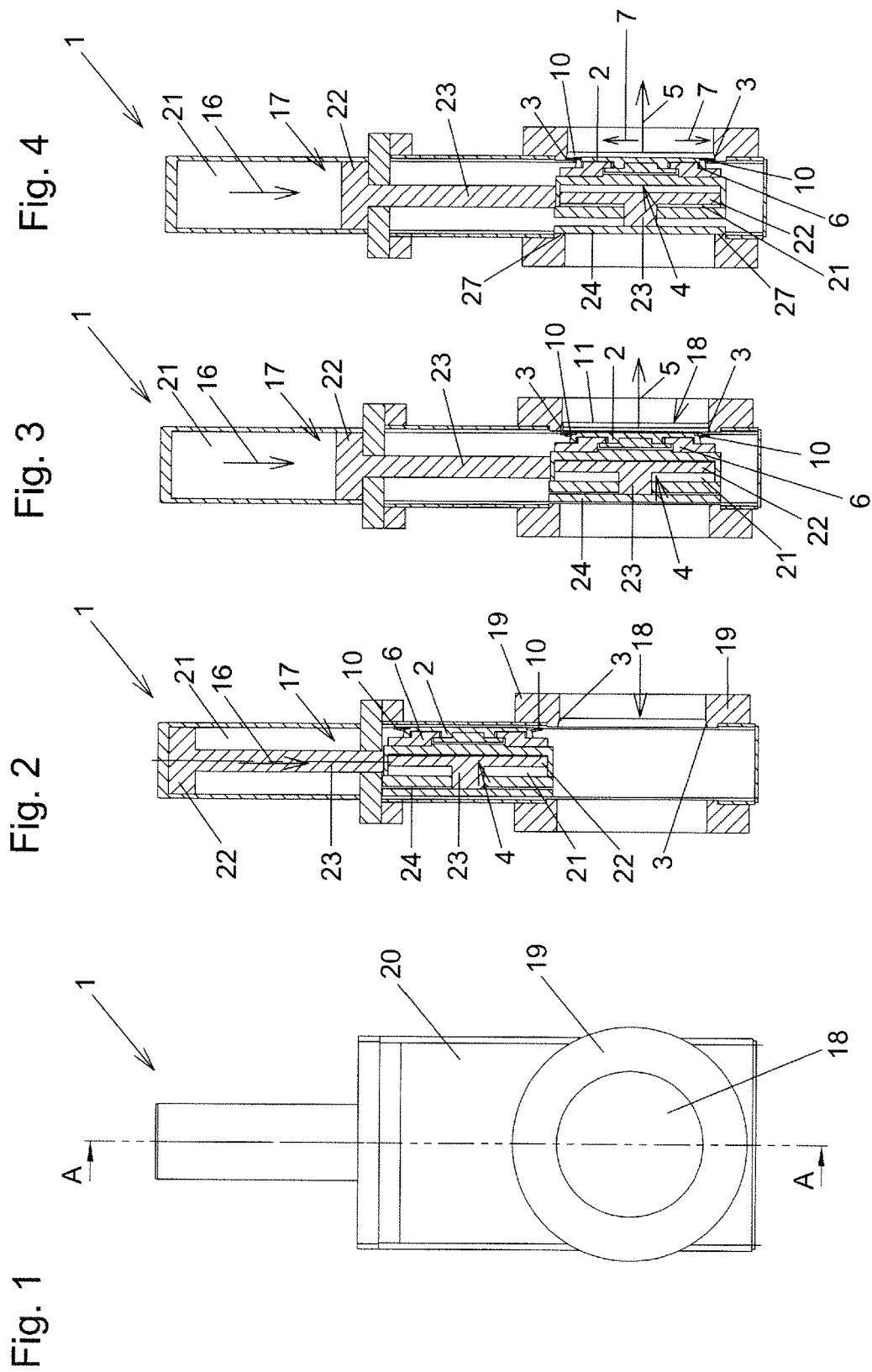

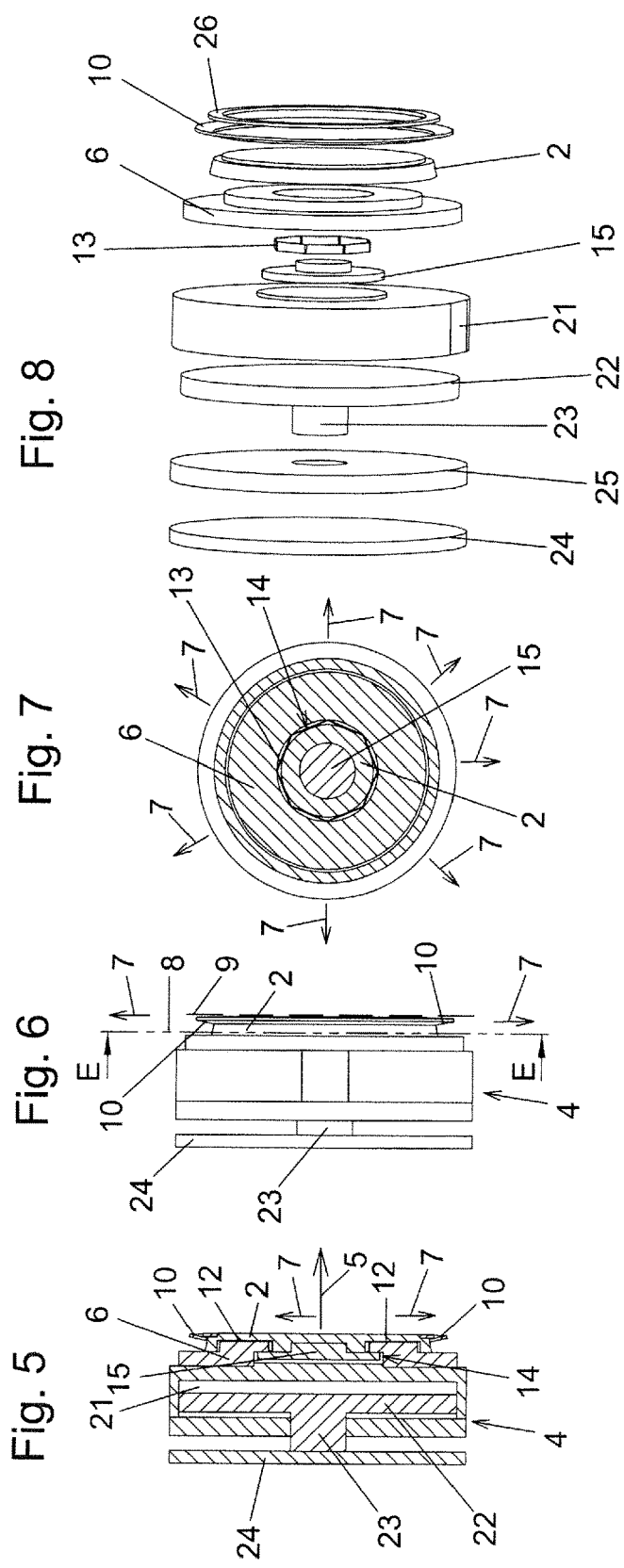

VALVE, PREFERABLY VACUUM VALVE

BACKGROUND

The present invention relates to a valve, preferably a vacuum valve, comprising at least one closure member and at least one valve seat, and comprising at least one drive unit, wherein the closure member, in a closed position, is pressed against the valve seat and, in a raised position, is raised from the valve seat, and is movable by the drive unit, in an, in particular linear, closing direction, from the raised position into the closed position.

Valves of this type, and in particular also vacuum valves, are known in numerous embodiments in the prior art. In order that the closure member, in particular when used in the vacuum sector, can bear in its closed position in a fully sealing manner against the valve seat and be pressed against this, it should be optimally aligned with the valve seat. In practice, it often presents difficulties to ensure this with appropriately low tolerances. DE 29 51 150 A1 proposes in this context to connect a sealing ring to one of the two sealing surfaces by shrink fitting in order thus to allow relatively large compensation movements and adaptation movements.

SUMMARY

The object of the invention is to provide a different solution to this problem.

To this end, the present invention provides that the closure member, for the alignment of the closure member as it is pressed against the valve seat, is mounted on a support body of the drive unit displaceably in at least one direction orthogonally or transversely to the closing direction.

In other words, the closure member, by virtue of an appropriate mounting on the support body of the drive unit, is granted an additional degree of freedom of movement in a direction orthogonally or transversely to the closing direction. This enables an exact alignment, preferably centering, of the closure member on the valve seat when it is brought into the closed position. As a result, the closure member can be pressed in an optimally sealing manner against the valve seat. A direction orthogonal to the closing direction is given when the direction runs perpendicular to the closing direction. Transverse are all those angles which deviate from an orthogonal orientation and from a coaxiality or parallelism. Favorably, these directions lie transversely to the closing direction within an angular range of +/−20°, preferably +/−10°, about a right angle or the orthogonal direction to the closing direction.

In the case of a displaceable mounting of the closure member in a direction orthogonal to the closing direction, this could also be termed a radial displaceable mounting.

In preferred embodiments of the invention, it can be sensible, depending on the shape of the closure member and of the valve seat, to enable this displaceable mounting not only in one, but in a multiplicity of directions orthogonally or transversely to the closing direction. Particularly preferred embodiments provide that the closure member, for the alignment of the closure member as it is pressed against the valve seat, is mounted on the support body of the drive unit so as to be displaceable, in a plane orthogonally or transversely to the closing direction, in all directions. Particularly preferred, the closure member is thus mounted on the support body of the drive member so as to be displaceable in all directions radially with respect to the closing direction.

Depending on the field of application for the valve, the closure member can be very differently configured. It can be in the form, for example, of a valve pin or a valve needle, as is employed, in particular, in gas metering valves or the like. If the valve according to the invention is in the form of a so-called transfer valve, in which larger components have to be transported through the valve opening surrounded by the valve seat, larger closure members are employed. Particularly preferred embodiments of the invention provide that the closure member is a valve disk. A valve disk is a planar plate-like/laminar structure, which is provided to close, preferably sealingly, by appropriate contact or appropriate pressing against the valve seat, the valve opening surrounded by the valve seat. Particularly preferred embodiments of valve disks have a circular outer contour. Valve disks can also, however, have a rectangular or square outer contour, where necessary provided with rounded corners. The valve seats respectively have a shape adapted thereto. The valve disk can, but does not have to be, of flat configuration. Particularly preferred embodiments respectively provide that the closing direction forms a surface normal to a closing plane of the valve disk. The closing plane is here spanned by that circumferential region of the valve disk which bears against the valve seat when the valve disk is pressed against the valve seat. Both the closure member and the valve seat can carry at least one seal. Both on the valve seat and on the closure member can thus be fixed at least one seal.

In order to automatically procure the alignment of the closure member as it is pressed against the valve seat, particularly preferred embodiments of the invention provide that the closure member and/or the valve seat and/or at least one seal disposed, in the closed setting, between the closure member and the valve seat, has or have, for the alignment of the closure member as it is pressed against the valve seat, a cross-sectional area which tapers in the closing direction. This can be a case of, for example, at least in some sections, rotationally symmetric cross-sectional areas which taper in the closing direction. Particularly preferred, the closure member and/or the valve seat and/or at least the seal disposed between the closure member and the valve seat are conically configured. In the case of the conical design, this could also be referred to as a frustoconical surface or the like.

In order to keep the friction forces as low as possible during the displacement of the closure member relative to the support body, preferred variants of the invention provide that the closure member, with the interposition of at least one slide bearing, is mounted displaceably on the support body of the drive unit. A wide variety of slide bearings can here be employed. For example, these can be in the form of a lubricating layer, a plastics coating, for example with Teflon (polytetrafluoroethylene), or of sliding elements such as bronze bushes or the like. Roller or ball bearings would also be possible, but also relative complex and expensive.

In order to keep the closure member relative to the support body in a pre-settable neutral position when the closure member is raised from the valve seat, preferred embodiments of the invention provide that the valve has a pretensioning spring for the elastic pretensioning of the closure member in the direction toward a neutral position relative to the support body of the drive unit. With this pretensioning spring, a return into the neutral position can take place automatically when the closure member is raised from the valve seat.

For the seal which may possibly be arranged on the valve seat or on the closure member, there are a wide variety of embodiments and options, in particular in the form of sealing rings. For example, such a sealing ring or such a seal can likewise have a conical shape. Examples of suitable seals are shown, without loss of generality, in DE 29 51 150 A1, DE 44 46 947 A1, but also in U.S. Pat. No. 4,627,599 A.

For the realization of the inventive displaceability of the closure member relative to the support body of the drive unit in at least one direction orthogonally or transversely to the closing direction, there are various options. Particularly preferred variants of the invention provide that the support body of the drive unit has at least one receiving space and the closure member has a bearing element mounted with play in this receiving space, or that the closure member has at least one receiving space and the support body of the drive unit has a bearing element mounted with play in this receiving space. The play is here preferably present in the direction orthogonally or transversely to the closing direction. The receiving space and/or the bearing element is or are in these embodiments are preferably of rotationally symmetric design, wherein the receiving space has a larger diameter or a larger cross-sectional area than the bearing element, so that the play required for the displacement movement results from this. Particularly preferred variants of such embodiments of valves according to the invention provide that the receiving space and/or the bearing element, viewed in a longitudinal section parallel to the closing direction, is or are of a T-shaped configuration.

According to the invention, valves can be configured such that the closure member can be moved by the drive unit solely in the closing direction and in the opposite direction. Embodiments of valves according to the invention are also possible, however, in which the closure member can be moved not only in the closing direction and in the direction opposite thereto, but also in directions, preferably orthogonal, angled-off therefrom. For these movements, at least a second drive unit can, but does not have to be provided. Particularly preferred, valves according to the invention are in the form of so-called L-valves. In preferred variants, it is thus provided that the closure member, starting from the raised position, is movable in a direction, preferably orthogonal, angled off from the closing direction, preferably by at least a second drive unit, into an opening position, wherein the closure member, in the opening position, is brought wholly, or at least partially, out of registration with a valve opening surrounded by the valve seat. While the closure member in the raised position no longer bears against the valve seat, yet is still, however, arranged in registration with the valve opening, the opening position provides that the closure member is totally no longer, or at least partially no longer, in registration with the valve opening, and thus wholly or partially frees this same.

As already indicated, valves according to the invention are particularly preferably employed in so-called vacuum engineering. Generally the term "vacuum engineering" is used when operating states with pressures less than or equal to 0.001 mbar (millibar) or 0.1 Pascal are achieved. Vacuum valves are valves which are designed for these pressure ranges and/or corresponding pressure differences relative to the environment. The term "vacuum valves" can however also in general be used where these are designed for pressures below normal pressure, i.e. below 1 bar.

BRIEF DESCRIPTION OF THE DRAWINGS

Further features and details of preferred embodiments of the invention are explained by way of example with reference to a preferred illustrative embodiment in the description of the figures, in which:

FIG. 1 shows an external view of a valve according to the invention;

FIGS. 2, 3 and 4 show the closure member in the opening position, the raised position and the closed position, respectively in a longitudinal section along the sectional line AA from FIG. 1;

FIG. 5 shows a longitudinal section through the drive unit and the closure member;

FIG. 6 shows a side view hereof;

FIG. 7 shows a section along the sectional plane EE from FIG. 7; and

FIG. 8 shows an exploded representation of the components of the drive unit and of the closure member.

DETAILED DESCRIPTION OF THE PREFERRED EMBODIMENTS

The valve 1 according to the invention, represented in FIG. 1, has, as is known per se, a housing 20, and two flanges 19 surrounding the valve opening 18. With these flanges 19, the valve 1 can be fastened to a corresponding process chamber or line or the like. This is known per se and does not have to be explained further.

FIGS. 2, 3 and 4 respectively show longitudinal sections along the sectional line AA. In FIG. 2, the valve member 2 of the valve 1 is in the opening position. In this opening position, the closure member 2 is in this illustrative embodiment brought totally out of registration with the valve opening 18 surrounded by the valve seat 3. In the opening position, the closure member 2, in this illustrative embodiment, thus fully frees the valve opening 18. In FIG. 3 is shown the raised position, in which the closure member 2, in the here shown illustrative embodiment, though it is raised from the valve seat 3, is still in registration with the valve opening 18. If the closure member 2 is now forced by the drive unit 4 out of this position according to FIG. 3, in the closing direction 5, against the valve seat 3, then the closed position shown in FIG. 4, in which the closure member 2 is pressed against the valve seat 3, is reached. The movement of the closure member 2 in the closing direction 5 and counter to the closing direction 5, i.e. between the positions according to FIGS. 3 and 4, is realized in the shown illustrative embodiment by a drive unit 4, which is configured as a pneumatic piston-cylinder unit. It thus has a piston 22 mounted displaceably in the cylinder 21 of the drive unit 4. On the piston 22 is found in the drive unit 4 a piston rod 23, which is connected to the counterpressure plate 24. For the supporting of the drive unit 4 on the side opposite to the closure member 2, the counterpressure plate 24, as the closure member 2 is pressed against the valve seat 3, is supported against the counter-seat 27.

For the to-and-fro movement of the closure member 2, together with the drive unit 4, in the direction 16 and in the direction directed opposite thereto, between the opening position according to FIG. 2 and the raised position according to FIG. 3 there is in this illustrative embodiment provided a second drive unit 17. This is here likewise configured as a pneumatic piston-cylinder unit. It has a piston 22, which is guided in the cylinder 21 and to the piston rod 23 of which is fastened the drive unit 4, together with the closure member 2. In total, the closure member 2 can thus be moved along an L-shaped motional path. In the here shown illustrative embodiment of a valve 1 according to the invention, this is an embodiment of a so-called L-valve. As already explained in the introduction, the invention is naturally, however, not limited to such L-valves.

In this illustrative embodiment, both drive units 4 and 17 are configured as pneumatic piston-cylinder units. In this context, it is pointed out that this does not have to be so. Within the scope of the invention, drive units of quite different type, for example hydraulic, electric and/or mechanical drive units, as are shown, for example, in CH 659 512, can also be used.

In order, as it is pressed against the valve seat 3, to be optimally aligned with the latter, the closure member 2 is in this illustrative embodiment, according to the invention, mounted displaceably in at least one direction 7 orthogonally or transversely to the closing direction 5. In the illustrated variant, the direction 7 is oriented orthogonally to the closing direction 5. The displaceability is configured such that the closure member 2, here configured as a valve disk, starting from the neutral position, is able to be displaced in all directions 7 radially, i.e. in a plane 8 orthogonal to the closing direction 5. The closing direction 5 forms a surface normal to the closing plane 9 (marked in FIG. 6) of the valve disk.

For the realization of the displaceable mounting of the closure member 2 on the support body 6 of the drive unit 4, in this illustrative embodiment it is provided that the support body 6 of the drive unit 4 has at least one receiving space 14, and the closure member 2 has a bearing element 15 mounted with play in this receiving space 14. This can be seen particularly clearly in FIG. 5 in the longitudinal section through the closure member 2 and the drive unit 4. Both the receiving space 14 and the bearing element 15 are here, viewed in a longitudinal section parallel to the closing direction 5, of T-shaped configuration. This too can be seen clearly in FIGS. 2-4 and 5. In order to keep the friction forces low, between the closure member 2 and the support body 6 is configured a slide bearing 12.

As already explained in the introduction, preferred variants of the invention provide that the closure member 2 and/or the valve seat 3 and/or at least one seal 10 disposed, in the closed position, between the closure member 2 and the valve seat 3, has or have, for the alignment of the closure member 2 as it is pressed against the valve seat 3, a cross-sectional area 11 which tapers in the closing direction 5. In the here shown illustrative embodiment, the valve seat 3 is, for this purpose, conically configured, as can be seen particularly clearly in FIGS. 2 to 4. Also, in the conical configuration, the cross-sectional area 11 of the valve seat 3 tapers in the closing direction 5. The same effect can also be obtained, however, if the seal 10 which is here disposed on the closure member 2, or the closure member 2 itself, is configured correspondingly conically, or with a cross-sectional area 11 which tapers in the closing direction 5. For the sake of completeness, it is pointed out that the seal 10 could naturally be fixed, instead of to the closure member 2, also to the valve seat 3.

In order to keep the closure member 2 relative to the support body 6 of the drive unit 4 in a neutral position, or to bring it into this same, when the closure member 2 is raised from, or is lifted off the valve seat 3, in the shown illustrative embodiment a pretensioning spring 13 is provided. This can be seen particularly clearly in FIGS. 7 and 8. It is here configured as a circumferential spring of star-shaped contour, which is disposed in the here annular receiving space 14 between the support body 6 and the closure member 2, or the bearing element 15 thereof. The annular free space enables a displacement of the closure member 2 relative to the support body 6, as it is pressed against the valve seat 3, in all directions 7 in the plane 8 orthogonal to the closing direction 5. The pretensioning spring 13 then correspondingly, as the closure member 2 is lifted off the valve seat 3, again ensures a corresponding return from all these directions into the neutral position shown in FIG. 7.

In FIG. 8, the various components of the drive unit 4 and of the closure member 2 are further shown in an exploded representation. In the here realized illustrative embodiment there is provided a back-up ring 26, which fixes the conically shaped seal to the closure member 2. In order to be able to show the piston 22, together with the piston rod 23, outside the cylinder 21 in this exploded representation, the cylinder rear wall 25 is represented raised from the cylinder 21.

Caption to the Reference Numerals:
1 valve
2 closure member
3 valve seat
4 drive unit
5 closing direction
6 support body
7 direction
8 plane
9 closing plane
10 seal
11 cross-sectional area
12 slide bearing
13 pretensioning spring
14 receiving space
15 bearing element
16 direction
17 second drive unit
18 valve opening
19 flange
20 housing
21 cylinder
22 piston
23 piston rod
24 counterpressure plate
25 cylinder rear wall
26 back-up ring
27 counter-seat

The invention claimed is:

1. A valve comprising a closure member, a valve seat, and a drive unit, the closure member, in a closed position, is pressed against the valve seat and, in a raised position, is raised from the valve seat, and is movable by the drive unit, in a closing direction, from the raised position into the closed position, and for alignment of the closure member as it is pressed against the valve seat, the closure member is mounted on a support body of the drive unit displaceably in at least one direction orthogonally or transversely to the closing direction; and a pretensioning spring for elastic pretensioning of the closure member in a direction toward a neutral position relative to the support body of the drive unit, wherein the pretensioning spring is configured as a circumferential spring of star-shaped contour, which is disposed in an annular receiving space between the support body and the closure member.

2. The valve as claimed in claim 1, wherein the closure member, for the alignment of the closure member as it is pressed against the valve seat, is mounted on the support body of the drive unit so as to be displaceable, in a plane orthogonally or transversely to the closing direction, in all directions.

3. The valve as claimed in claim 1, wherein the closure member is a valve disk.

4. The valve as claimed in claim 3, wherein the closing direction defines a normal to a closing plane of the valve disk.

5. The valve as claimed in claim 1, wherein at least one of the closure member, the valve seat, or at least one seal disposed, in the closed position, between the closure member and the valve seat, has or have, for the alignment of the closure member as it is pressed against the valve seat, a cross-sectional area which tapers in the closing direction.

6. The valve as claimed in claim 1, further comprising at least one slide bearing, and the closure member is mounted displaceably on the support body of the drive unit with the slide bearing.

7. The valve as claimed in claim 1, wherein the closure member, starting from the raised position, is movable in a direction angled off from the closing direction into an opening position, and the closure member, in the opening position is brought at least partially out of registration with a valve opening surrounded by the valve seat.

8. The valve as claimed in claim 7, wherein the closure member, starting from the raised position, is movable in a direction orthogonal from the closing direction by at least a second drive unit into an opening position.

9. The valve as claimed in claim 1, wherein the valve comprises a vacuum valve.

10. The valve as claimed in claim 1, wherein at least one of the closure member, the valve seat, or at least one seal disposed, in the closed position, between the closure member and the valve seat, has or have, for the alignment of the closure member as it is pressed against the valve seat, a conically configured cross-sectional area which tapers in the closing direction.

11. The valve as claimed in claim 1, wherein the annular receiving space is situated between the support body and a bearing element of the closure member.

* * * * *